US010182371B2

(12) United States Patent
Fitch et al.

(10) Patent No.: US 10,182,371 B2
(45) Date of Patent: Jan. 15, 2019

(54) COMMUNICATIONS NETWORK (71) Applicant: British Telecommunications Public Limited Company, London (GB)

(72) Inventors: Michael Fitch, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/562,815

(22) PCT Filed: Feb. 19, 2016

(86) PCT No.: PCT/EP2016/053608
§ 371 (c)(1),
(2) Date: Sep. 28, 2017

(87) PCT Pub. No.: WO2016/155942
PCT Pub. Date: Oct. 6, 2016

(65) Prior Publication Data
US 2018/0109974 A1    Apr. 19, 2018

(30) Foreign Application Priority Data
Mar. 30, 2015  (EP) ..................... 15161645

(51) Int. Cl.
*H04W 28/02*        (2009.01)
*H04W 28/08*        (2009.01)
(Continued)

(52) U.S. Cl.
CPC ... *H04W 28/0284* (2013.01); *H04W 28/0268* (2013.01); *H04W 28/08* (2013.01);
(Continued)

(58) Field of Classification Search
CPC ............ H04W 28/0284; H04W 28/08; H04W 28/0268
See application file for complete search history.

(56) References Cited

U.S. PATENT DOCUMENTS

2013/0322235 A1   12/2013  Khoryaev et al.
2013/0322351 A1   12/2013  Tavildar et al.
(Continued)

FOREIGN PATENT DOCUMENTS

EP        2696530 A2     2/2014
WO    WO 2009/115554 A1  9/2009
(Continued)

OTHER PUBLICATIONS

International Search Report for corresponding International Application No. PCT/EP2016/053608 dated Apr. 7, 2016; 4 pages.
(Continued)

*Primary Examiner* — Siming Liu
(74) *Attorney, Agent, or Firm* — Amy M. Salmela; Patterson Thuente Pedersen, P.A.

(57) ABSTRACT

This disclosure relates to a method of controlling a Customer Premises Equipment (CPE), and a CPE, in a cellular communications network, the cellular communications network having an overlapping coverage area with a Wireless Local Access Network, WLAN, the method including: receiving data relating to the WLAN and cellular communications networks; analyzing the received data; and configuring a downlink capacity of the cellular communications network based on the analysis of the received data.

13 Claims, 3 Drawing Sheets

(51) Int. Cl.
*H04W 72/04* (2009.01)
*H04W 88/10* (2009.01)
*H04L 12/725* (2013.01)

(52) U.S. Cl.
CPC ....... *H04W 72/0486* (2013.01); *H04L 45/302* (2013.01); *H04W 72/044* (2013.01); *H04W 88/10* (2013.01)

(56) References Cited

U.S. PATENT DOCUMENTS

| | | | | |
|---|---|---|---|---|
| 2014/0029527 | A1* | 1/2014 | Okuda | H04W 72/085 370/329 |
| 2014/0161002 | A1* | 6/2014 | Gauvreau | H04W 16/24 370/280 |
| 2014/0321376 | A1 | 10/2014 | Daivinjanovic et al. | |

FOREIGN PATENT DOCUMENTS

| | | |
|---|---|---|
| WO | WO 2012/053952 A1 | 4/2012 |
| WO | WO 2012/166671 A1 | 12/2012 |
| WO | WO 2013/112372 A1 | 8/2013 |
| WO | WO 2015/013189 A1 | 1/2015 |

OTHER PUBLICATIONS

Written Opinion of the International Searching Authority for corresponding International Application No. PCT/EP2016/053608 dated Apr. 7, 2016; 7 pages.
Written Opinion of the International Preliminary Examining Authority for corresponding International Application No. PCT/EP2016/053608 dated Mar. 8, 2017; 6 pages.
International Preliminary Report on Patentability for corresponding International Application No. PCT/EP2016/053608 dated Jun. 16, 2017; 6 pages.
Extended European Search Report for corresponding EP Patent Application No. 15161645.5 dated Sep. 15, 2015; 8 pages.
3rd Generation Partnership Project, "Technical specification group radio access network; Evolved universal terrestrial radio access (E-UTRA); Study on signalling and procedure for interference avoidance for in-device coexistence (Release 11)," 3GPP TR 36.816 V11.2.0 (Dec. 2011); 44 pages.
Ericsson, "Introduction of Band 41 for ISM coexistence," TSG-RAN Working Group 4 (Radio) meeting #54, San Francisco, US (Feb. 22-26, 2010); 5 pages.
Global TD-LTE Initiative, "TDD spectrum white paper," Version 2.0 (May 25, 2013); 55 pages.

* cited by examiner

COMMUNICATIONS NETWORK

CROSS-REFERENCE TO RELATED APPLICATIONS

The present application is a National Phase entry of PCT Application No. PCT/EP2016/053608, filed on 19 Feb. 2016, which claims priority to EP Patent Application No. 15161645.5, filed on 30 Mar. 2015, which are hereby fully incorporated herein by reference.

TECHNICAL FIELD

The present disclosure relates to a communications network.

BACKGROUND

Wireless Local Area Network (WLAN) technology includes the well-known IEEE 802.11 family of standards (commonly known as Wi-Fi). Wi-Fi uses 2.4 GHz, and more recently 5 GHz, radio frequency bands to allow two Wi-Fi devices to communicate wirelessly with one another.

Wi-Fi network nodes use a contention based protocol to provide shared and fair access to each channel in the frequency bands. A well-known contention based protocol is Carrier Sense Multiple Access with Collision Avoidance (CSMA/CA). In this protocol, a first node sends a data packet to a second node by first sensing a channel to determine if it is idle or not. This is known as a Carrier Sense, CS. If it is determined that the medium is idle, then a transmission attempt may occur. If the medium is not idle, then the first node concludes that the particular channel is busy. The first node may then attempt to transmit on this channel once it has returned to an idle state and a random delay (known as a back-off timer) has elapsed.

Another communications technology, known as small cells (or femtocells, picocells, metrocells or microcells, depending on their coverage areas), has grown in popularity in recent years. These small cells provide cellular communications over a coverage area which is typically much smaller than the traditional macrocell, and is thus suitable to provide cellular coverage within the customer's premises. However, at least one implementation of small cell technology, such as the Long-Term Evolution (LTE) evolved Node B (eNodeB) basestation, uses 2.3 GHz and 2.6 GHz frequency bands for communications. The present inventors have realized, through laboratory testing, that communications between two LTE eNodeBs can cause interference on the 2.4 GHz Wi-Fi frequency band. This is due to out-of-band transmissions from the eNodeB causing sufficient noise on the Wi-Fi 2.4 GHz frequency band that a Wi-Fi node determines that the channel is busy during a Carrier Sense operation. The capacity of the Wi-Fi network is thus compromised by the LTE transmissions.

There are a number of techniques to manage collocated Wi-Fi and small cell devices (i.e. either nearby or when located in the same unit). These are typically routing functions which decide on whether to route traffic over Wi-Fi or the small cell depending on, for example, the Quality of Service (QoS) demands of the data being transmitted (e.g. in application/IP layer bonding) or based on predetermined policies (e.g. ANDSF). However, any transmission over the small cell device may, as detailed above, cause sufficient interference on the Wi-Fi frequency band that any Wi-Fi transmission may be inadvertently blocked. One solution to this problem is to only transmit over Wi-Fi or via the small cell at any one time. However, this clearly introduces undesirable limitations in each network's capacity.

It is therefore desirable to alleviate some or all of the above problems.

SUMMARY

According to a first aspect of the disclosure, there is provided a method of controlling a Customer Premises Equipment (CPE) in a cellular communications network, the cellular communications network having an overlapping coverage area with a Wireless Local Access Network (WLAN) the method comprising: receiving data relating to the WLAN and cellular communications networks; analyzing the received data; and configuring a downlink capacity of the cellular communications network based on the analysis of the received data.

The configuring of the downlink capacity of the cellular communications network may include changing the ratio of uplink capacity to downlink capacity of the cellular communications network.

The analyzing of the received data may include comparing a data point in the received data to a predetermined threshold.

The method may further comprise: receiving new data relating to the WLAN and cellular communications networks; analyzing the new received data; and reconfiguring the downlink capacity of the cellular communications network based on the analysis of the new received data.

The received data may relate to congestion in the cellular and/or WLAN communications networks. The received data may also relate to devices in the cellular and/or WLAN communications networks. If both the cellular and WLAN communications networks are congested, the downlink capacity of the cellular communications network may be configured based on a predetermined policy.

A non-transitory computer-readable storage medium storing a computer program or suite of computer programs which upon execution by a computer system performs the method of the first aspect of the disclosure.

According to a second aspect of the disclosure, there is provided a Customer Premises Equipment (CPE) comprising a cellular transceiver configured for transmissions in a cellular communications network; and a processor adapted to receive data relating to the WLAN and cellular communications networks, analyze the received data, and define a downlink capacity of the cellular communications network based on the analysis of the received data, wherein transmissions by the cellular transceiver are in accordance with the defined downlink capacity.

The processor may be adapted to configure the downlink capacity of the cellular communications network by changing the ratio of uplink capacity to downlink capacity of the cellular communications network.

The processor may analyze the received data by comparing a data point in the received data to a predetermined threshold.

The processor may be adapted to receive new data relating to the WLAN and cellular communications networks; analyze the new received data; and define a new downlink capacity of the cellular communications network based on the analysis of the new received data, wherein transmissions by the cellular transceiver may be in accordance with the new defined downlink capacity.

The received data may relate to congestion in the cellular and/or WLAN communications networks. The received data may also relate to devices in the cellular and/or WLAN communications networks.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
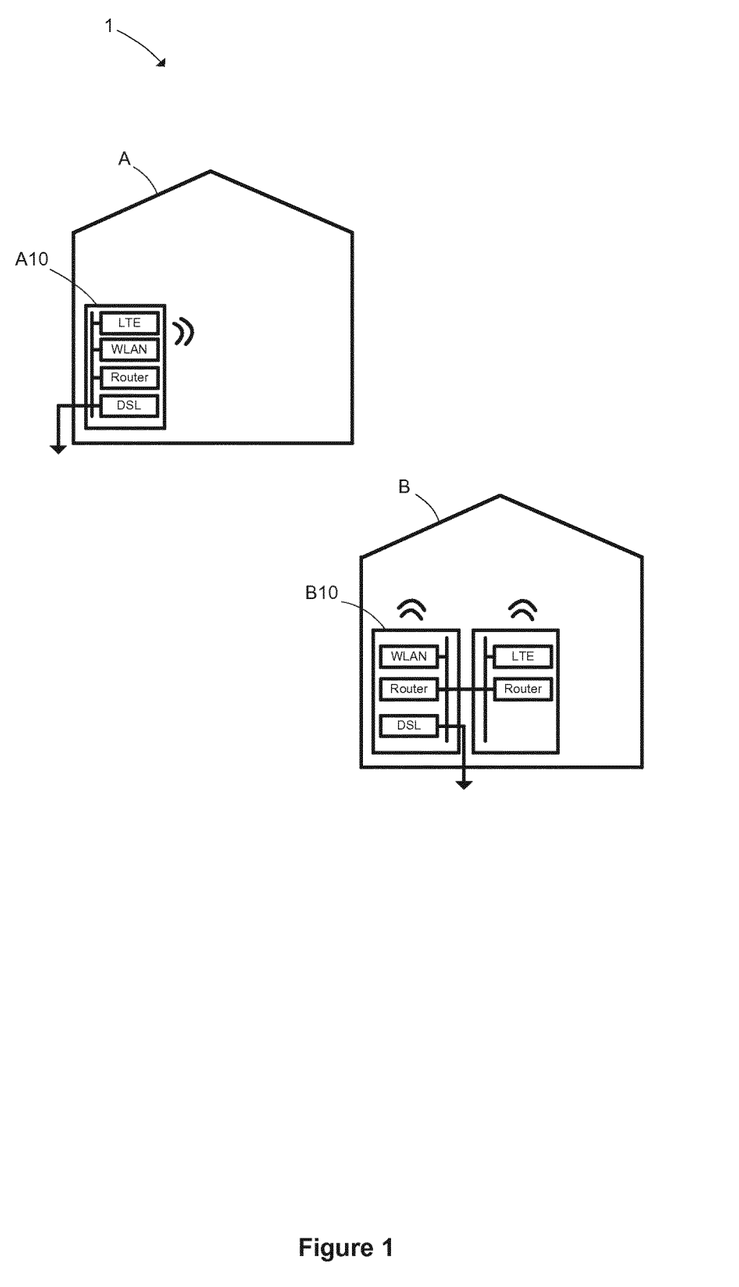
FIG. 1 is a schematic diagram of an embodiment of a communications network of the present disclosure.

A first embodiment of the present disclosure will now be described with reference to FIGS. 1 to 2. FIG. 1 illustrates two dwellings A, B, each having Customer Premises Equipment (CPE) A10, B10. Each CPE includes a cellular module (acting as a small cell (e.g. a femtocell, metrocell, microcell or picocell), marked as "LTE"), a Wireless Local Area Network (WLAN), a router and a DSL modem. The first CPE A10 contains all these elements in a single unit, whilst the second CPE A10 distributes these elements about two units (separating the small cell and WLAN parts). In both cases, the WLAN and small cell parts of each CPE have overlapping coverage areas, such that small cell transmissions from the first CPE may interfere with WLAN transmissions of both the first and second CPE. This form of interference was discussed in the Background section above.

Figure 2:
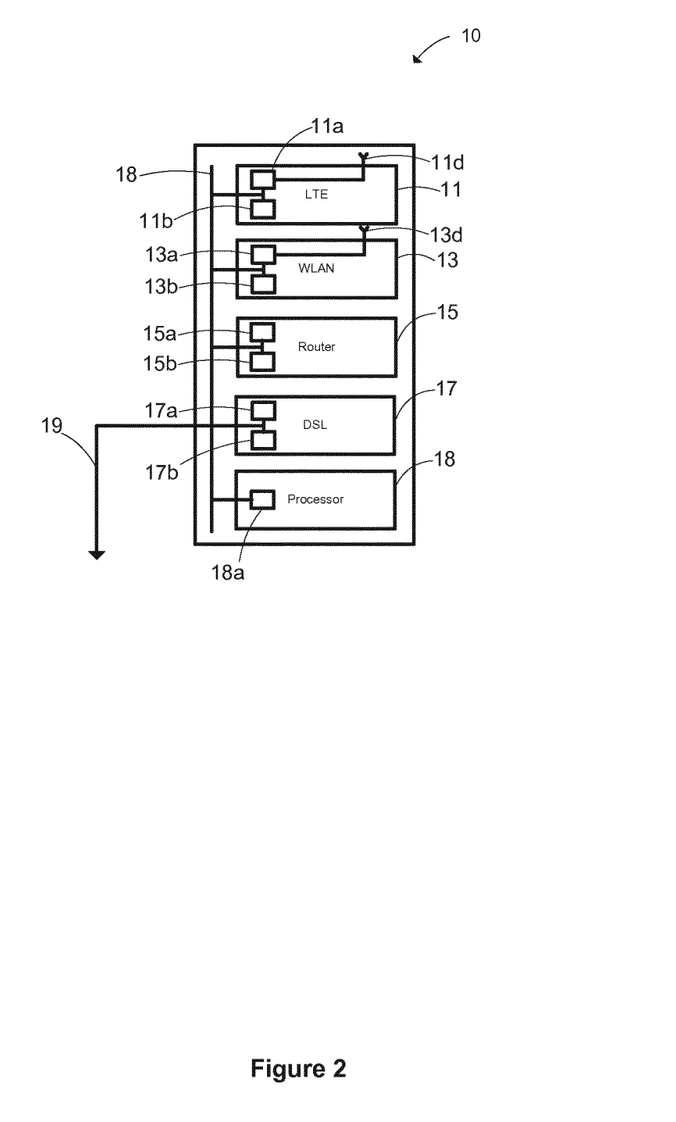
FIG. 2 is a schematic diagram of a Customer Premises Equipment (CPE) of the communications network of FIG. 1.

A schematic diagram showing the components of each CPE 10 is shown in more detail in FIG. 2. The CPE 10 includes a cellular module (labeled 'LTE') 11, Wireless Local Area Network (WLAN) module 13, a router module 15, a DSL modem module 17 and a processor 18. Each module also includes its own processing module 11a, 13a, 15a, 17a and memory module 11b, 13b, 15b, 17b. The modules are communicatively coupled to each other by a bus.

The cellular module 11 acts as a small cell (also known as "femtocell", "picocell", or "metrocell" depending on its coverage area), to provide cellular communications to User Equipment, UE, in the coverage area of the cellular module. Accordingly, the cellular module 11 includes a transceiver 11d, coupled to the processor 11a, to send and receive cellular signals. In this embodiment, the cellular module 11 is configured for communications using the Long Term Evolution (LTE) 4$^{th}$ Generation (4G) protocol in Time-Division Duplexing mode.

In this embodiment, the cellular module 11 processor 11a includes an admission control function. This allows the processor 11a to monitor all traffic being sent or received via the cellular module 11 and collect statistics such as load and traffic information, channel usage and UE information (e.g. number of UEs, type of each UE, communications technologies employed by UE, etc.). These statistics may be reported to the processor 18, as will be described in more detail below.

The WLAN module 13 provides wireless communications to UEs in its coverage area. The WLAN module 13 therefore also includes a transceiver 13d, coupled to the processor 13a, to send and receive wireless signals. In this embodiment, the WLAN module 13 is configured for communications using any one of the IEEE 802.11 family of standards (commonly known as "Wi-Fi"). Again, in this embodiment, the WLAN module 13 processor 13a includes an admission control function. This allows the processor 13a to monitor all traffic being sent or received via the WLAN module 13 and collect statistics such as load and traffic information, channel usage and UE information. These statistics may also be reported to the processor 18.

The router module 15 is configured to route data packets between the various modules and between UEs connected to any one of the modules, and works in accordance with conventional routing devices. Similarly, the DSL module 17 is configured to modulate and demodulate signals sent/received via the backhaul 19, which are then routed between the modules of the CPE and any UEs connected thereto by the router module 15.

The various modules of the CPE 10 provides a multitude of connectivity options between UEs and other entities in the network. For example, the cellular module 11 provides cellular connectivity between any UE connected to that module and the backhaul 19 (providing voice and data communications with other UEs, CPEs and networks), and also cellular connectivity between that module and any other cellular module of another CPE (i.e. using an X2 interface) or other entities in the Core Network (e.g. a Mobility Management Entity (MME) using an S1 interface). The WLAN module 13 provides wireless connectivity to any UE connected to that module. When combined with the router module 15, this allows UEs connected to the WLAN module 13 to form a wireless network. When combined with the DSL module 17, this allows UEs connected to the WLAN module 13 to communicate with external networks (such as the Internet) over the backhaul connection 19.

The processor 18 includes a coordination block 18a. As noted above, the processor 18 is adapted to receive statistics on the cellular and WLAN transmissions of the first CPE 10. The coordination block 18a receives these statistics, and, in response, is configured to define a downlink capacity of the cellular module 11 based on these statistics. This will be described in greater detail below. In this embodiment, the coordination block 18a defines an uplink/downlink ratio for the cellular module 11 based on the received statistics, which is implemented by adapting the frame configuration of future transmissions. The scheduler may then make further refinements to the uplink/downlink ratio for the cellular module by adapting its Resource Block (RB) allocation. This method, and its advantages over the prior art, will now be described in more detail with reference to FIG. 3.

Figure 3:
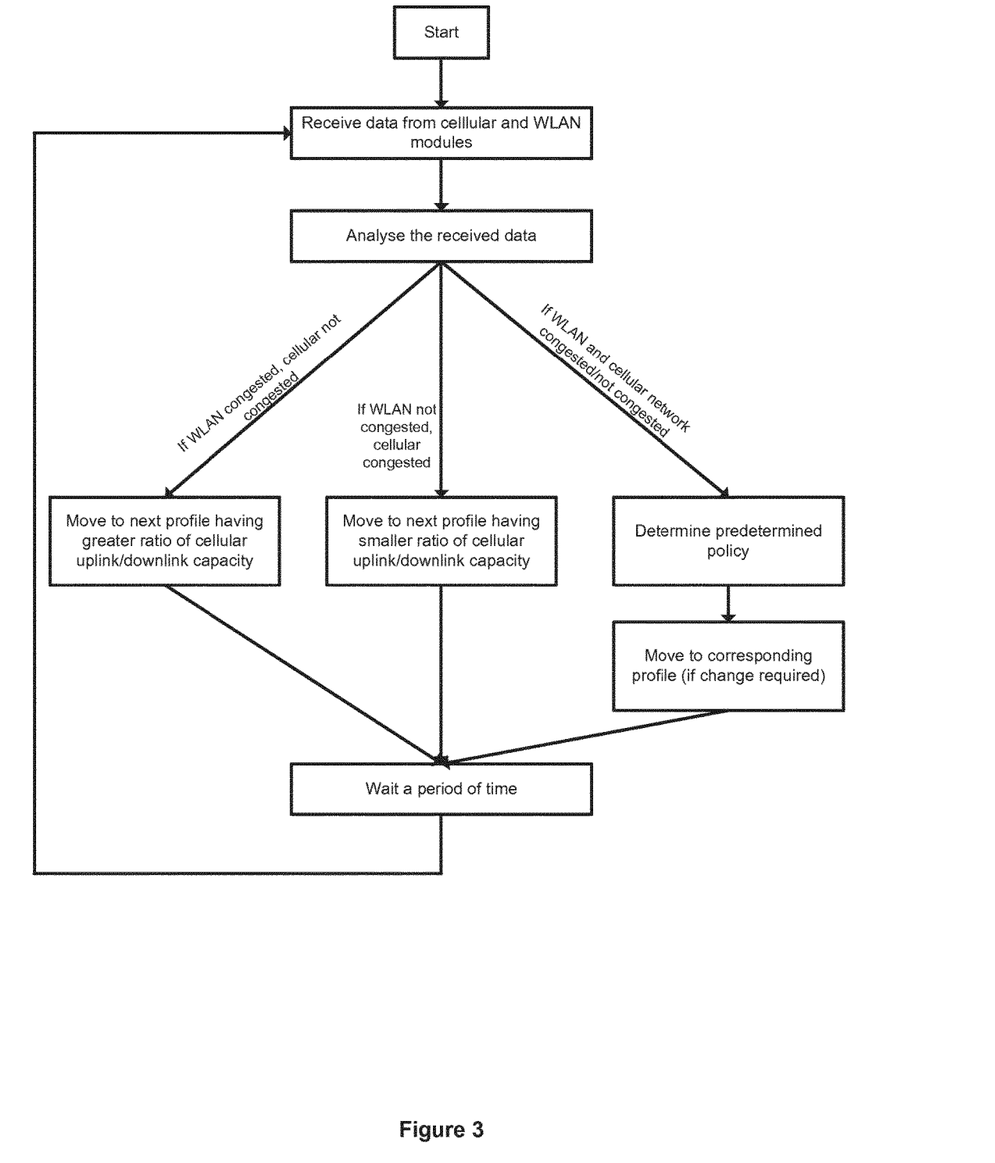
FIG. 3 is a flow diagram illustrating an embodiment of a method of the present disclosure.

As a first step, the admission control functions of the cellular module processor 11a and the WLAN module processor 13a monitor all traffic being sent and received over their respective transceivers 11d, 13d and collect data on this traffic. In this embodiment, this data is congestion related data, such as buffer lengths, cumulative data rates and delay time. This data is reported to the coordination block 18a of processor 18. An example of this data is shown in table form, below.

TABLE 1

Data received from the admission control functions of the cellular module processor and WLAN module processor at the coordination block.

| | | Congestion Data |
|---|---|---|
| Cellular Module 11 | Buffer Length: | $B_{LTE}$ |
| | Cumulative Data Rate: | $D_{LTE}$ |
| | ... | ... |
| WLAN Module 13 | Buffer Length: | $B_{WLAN}$ |
| | Cumulative Data Rate: | $D_{WLAN}$ |
| | ... | ... |

The coordination block 18a of processor 18 then compares this data to predetermined thresholds (which may be stored in memory modules 11b, 13b of the CPE 10). In one example, the coordination block 18a compares each data point (i.e. $B_{LTE}$, $D_{LTE}$, $B_{WLAN}$, $D_{WLAN}$) to respective thresholds. If any of these data points are above the respective predetermined threshold, then coordination block 18a determines that the corresponding network (e.g. the cellular network if either of $B_{LTE}$, $D_{LTE}$ exceed their respective threshold, or the WLAN network if either of $B_{WLAN}$, $D_{WLAN}$ exceed their respective threshold) is congested.

In another example, the coordination block 18a takes a more holistic approach to determine if either of the cellular or WLAN networks are congested. The coordination block 18a examines a plurality of data points for a particular module, and determines if the corresponding network is congested based on all data points in the plurality of data points. For example, the coordination block 18a may normalize all received data points, take an average of all these normalized values, and compare this average value to a predetermined threshold. This may be implemented using the following equation:

$$Z_{LTE,WLAN(i)} = \frac{X_{LTE,WLAN(i)} - \min(X)}{\max(X) - \min(X)}$$

In this equation, a new data point (e.g. a buffer length for the cellular module, $B_{LTE}$) is received and normalized to a number between 0 and 1 by using predetermined minimum and maximum points for that data point type. This is then performed for each data point for that module, returning a number between 0 and 1. In this example, these numbers are averaged to return $Z_{LTE,WLAN(ave)}$. This is then compared to a predetermined threshold for that module, $Z_{LTE,WLAN(threshold)}$, to determine if it is congested.

Accordingly, the coordination block 18a determines whether the cellular module and/or WLAN modules are congested, based on its own predetermined thresholds. The coordination block 18a may then react to this determination in a number of ways. A few examples will now be discussed, which are illustrated in the flow diagram of FIG. 3.

Example 1: LTE not Congested, WLAN Congested

In this example, the coordination block 18a determines that the data from the cellular module 11 indicates that it is not congested, but the data from the WLAN module 13 indicates that it is congested. The coordination block 18a reacts to this determination by decreasing the capacity of the cellular network (which may be regarded as excess capacity). The present inventors have realized that this reduces the congestion (e.g. the cellular transmissions that block the WLAN channel) and thus increases the capacity of the WLAN network. This is achieved, in this embodiment, by changing the uplink/downlink capacity of cellular module 11.

The coordination block 18a sends a control signal to the processor 11a of the cellular module 11 to increase its uplink capacity and thus reduce the downlink capacity. In this embodiment, the processor 11a of cellular module 11 stores a number of profiles, each having a particular ratio of uplink and downlink capacity, such as 90% uplink, 10% downlink; 80% uplink, 20% downlink; . . . ; and 10% uplink, 90% downlink, and moves to the next profile having a greater ratio of uplink to downlink capacity. The processor 11a of the cellular module 11 will then use the new profile to configure its frame configuration and RB allocation.

Following this change, there are fewer downlink transmissions (from CPE 10 to any connected UEs) in the cellular network. These downlink cellular transmissions are a prominent source of interference on nearby WLAN transmission bands. Accordingly, there is less interference between these downlink cellular transmissions and any WLAN transmissions by the WLAN module 13. The overall capacity of the WLAN network is therefore increased and congestion is reduced.

The admission control functions of the processors 11a, 13a of the cellular and WLAN modules 11, 13 continue to monitor traffic and report data back to the coordination block 18a of processor 18. In this embodiment, the coordination block 18 operates a form of feedback loop in which the coordination block 18a determines, after a period of time has elapsed following the change of profile, whether the change has been effective to reduce the level of congestion in the WLAN network. The coordination block 18a therefore determines, after the period of time has elapsed, whether the new data from the admission control function of the WLAN module 13 has now dropped below the predetermined thresholds. If so, then the coordination block 18a determines that no further action is necessary. However, if the new data has not dropped below the predetermined threshold, then it determines a further profile change is necessary. Accordingly, in this situation, the coordination block 18a sends a further control signal to the cellular module 11 to increase its uplink capacity and thus reduce the downlink capacity. The cellular module 11 then moves to the next profile having a greater ratio of uplink to downlink capacity. This process is repeated until the data from the admission control functions indicate that the level of congestion in the WLAN network has dropped below the predetermined threshold.

Example 2: LTE Network Congested, WLAN Network not Congested

In this example, the coordination block 18a determines that the data from the cellular module 11 indicates that the cellular network is congested, and the data from the WLAN module 13 indicates that the WLAN network is not congested. The coordination block 18a reacts to this determination by increasing the capacity of the cellular network. This has the effect of reducing the capacity of the WLAN network, but this is acceptable as the WLAN network is not congested (such that it is deemed to have excess capacity).

Accordingly, the coordination block 18a of the processor 18 sends a control signal to the processor 11a of the cellular module 11 indicating that it should increase its downlink capacity and decrease its uplink capacity. Again, this is achieved by the processor 11a moving to another profile. However, in this example, this profile has a smaller ratio of uplink capacity to downlink capacity. This is implemented by the processor adapting its frame configuration and RB allocation.

Thereafter, there is more capacity in the cellular network and the level of congestion is reduced. The coordination block 18a continues to monitor the level of congestion based on data from the admission control functions, and implements a feedback loop until the level of congestion in the cellular network drops below the predetermined threshold.

Example 3: LTE and WLAN Network Congested

In this example, the coordination block 18a determines that the data from the cellular module 11 and the WLAN module 13 indicate that both the cellular and WLAN networks are congested. The coordination blocks 18a reacts to this determination according to a predetermined policy (which may be part of the firmware of the CPE 10 and thus configurable by the Network Operator through firmware upgrades).

In this embodiment, the predetermined policy is to change the ratio of the uplink/downlink capacity of the cellular network to a particular ratio. This may be, for example, one that gives a greater amount of downlink capacity to the cellular network (to give a minimal level of service to the WLAN network and for uplink cellular traffic), as the cellular network may offer guaranteed Quality of Service to the end user. Accordingly, in this embodiment, the coordination block 18a sends a control signal to the processor 11a of the cellular module 11 indicating that it should move towards a particular ratio of uplink to downlink capacity. The processor 11a then moves to the corresponding profile (i.e. one having the correct, or closest, ratio of uplink to downlink capacity), which is implemented by changing its frame configuration and RB reallocation of future transmissions.

The admission control functions of the cellular module 11 and WLAN module 13 then continue to monitor the cellular and WLAN networks respectively and report data back to the coordination block 18a.

Example 4: LTE and WLAN Network not Congested

In this example, the coordination block 18a determines that the data from the cellular module 11 and the WLAN module 13 indicate that both the cellular and WLAN networks are not congested. The coordination block 18a again reacts to this determination according to a predetermined policy. In this embodiment, the predetermined policy is to do nothing (i.e. such that the cellular module 11 continues with the current profile). However, in alternative embodiments, the predetermined policy may be to change the ratio of uplink/downlink capacity of the cellular network to a particular ratio (in a similar manner to 'Example 3' above).

Second Embodiment

This second embodiment uses the same network architecture as described in the first embodiment, and the same reference numerals will be used. However, in this embodiment, the data reported by the admission control functions of the cellular module 11 and WLAN module 13 to the coordination block 18a includes device capability data in addition to the congestion related data. This may include, for example, the number of UEs connected to each module, and information on their required QoS. An example data set is shown in the table below.

| | Congestion Data | | Device Data | |
|---|---|---|---|---|
| Cellular Module 11 | Buffer Length: | $B_{LTE}$ | Number of connected UEs: | $UE_{LTE}$ |
| | Cumulative Data Rate: | $D_{LTE}$ | Required QoS: | Latency($UE_1$) < $L_1$ Date Rate ($UE_2$) > $D_2$ |
| | ... | ... | ... | ... |
| WLAN Module 13 | Buffer Length: | $B_{WLAN}$ | Number of connected UEs: | $UE_{WLAN}$ |
| | Cumulative Data Rate: | $D_{WLAN}$ | Required QoS: | N/A |
| | ... | ... | ... | ... |

In the above example, the coordination block 18a receives device related data indicating the number of UEs connected to the cellular module 11 via a cellular connection and the number of UEs connected to the WLAN module via a wireless connection, and further indicating the guaranteed QoS requirements for several of the UEs connected to the cellular module 11. These include a minimum latency requirement and a minimum data rate requirement for two separate UEs. There are no guaranteed QoS requirements for the UEs connected to the WLAN module 13.

The coordination block 18a then analyzes this data to determine if a change should be made. This includes the analysis steps undertaken on the congestion related data as detailed above in the first embodiment. However, the device related data is also taken into account in this analysis, as shown in the following examples.

Example 4: LTE not Congested, WLAN Congested, QoS Requirements for LTE UEs

In this example, the coordination block 18a determines that the cellular network is not congested but the WLAN network is congested. However, the coordination block 18 also determines that one or more of the UEs connected to the cellular module require a certain level of QoS.

In the similar example in the first embodiment of the present disclosure (Example 1), in which the cellular network is not congested and the WLAN is congested, the coordination block 18a sends a control signal to the processor 11a of the cellular network 11 to move to a greater ratio of cellular uplink capacity to downlink capacity. However, in this example, one or more UEs connected to the cellular module 11 require a certain level of QoS, which would be compromised if such a change were implemented. Accordingly, the coordination block 18a determines that no change should be made (or, alternatively, makes a smaller change than in Example 1 above). The coordination block 18a thus continues to monitor and analyze data reported from the admission control block.

Example 5: LTE Congested, WLAN not Congested, QoS Requirements for LTE UEs

In this example, the coordination block 18a determines that the cellular network is congested but the WLAN network is not congested, and also determines that one or more UEs connected to the cellular module require a certain level of QoS. In a similar manner to Example 2 of the first embodiment above, the coordination block 18a sends a control signal to the cellular module 11 indicating that it should decrease its ratio of uplink capacity to downlink capacity. However, in this enhancement, the cellular module 11 knows, based on the device data, that a certain data rate is required by one of the UEs connected to the cellular module 11. Accordingly, the control signal also indicates to the cellular module 11 the amount of change required in its uplink/downlink capacity ratio in order to satisfy this requirement.

Example 6: LTE Congested, WLAN Congested, QoS Requirements for LTE UEs

In this example, the coordination block 18a determines that the cellular and WLAN networks are both congested, and also determines that one or more UEs connected to the cellular module require a certain level of QoS. In a similar manner to Example 3 above, the coordination block 18a determines that a change in an uplink/downlink capacity should be made in accordance with the predetermined policy, the policy taking into account the QoS requirements for the LTE UEs. In this example, the predetermined policy is that the cellular module should have a particular uplink/downlink ratio in order to deliver the required QoS to those UEs. The coordination block 18a therefore sends a control signal to the processor 11a of the cellular module 11 to enact that change.

The embodiments above detail several non-exhaustive examples of how embodiments of the disclosure may be implemented. However, the skilled person will understand that there are a number of ways the received data may be analyzed and a number of ways the downlink capacity of the cellular network may be configured. For example, it is non-essential for the cellular module 11 to use a plurality of profiles in order to implement the uplink/downlink capacity changes. In alternative arrangements, the cellular module 11 may calculate the necessary changes (e.g. to its frame configuration or RB allocation) in order to implement a new uplink/downlink ratio.

Furthermore, the skilled person will understand that embodiments are not limited to use in a TDD-LTE system. That is, configuring the downlink capacity may also be implemented in a FDD-LTE system by appropriate reallocation of Resource Blocks.

In the above embodiments, the received data is analyzed to determine if it exceeds a predetermined threshold. The skilled person will understand that for time-varying values it would be appropriate to use time domain filtering (such as finite-impulse-response filtering) in order to determine a value to be compared to a threshold. The skilled person will also understand that the use of thresholds is non-essential, and that other analysis methods may be used.

In the second embodiment above, the invention utilizes device data in addition to congestion related data to determine if a change in downlink capacity is required. In the examples, only guaranteed QoS requirements for cellular network traffic is given. The skilled person will understand that there are no guaranteed QoS capabilities in WiFi networks (as defined in the IEEE 802.11 standards, the most common form of WLAN networks). However, there is the possibility to prioritize different traffic classes, which may be taken into account when configuring the downlink capacity of the cellular network.

The skilled person will understand that any combination of features is possible within the scope of the invention, as claimed.

The invention claimed is:

1. A method of controlling a Customer Premises Equipment (CPE) in a cellular communications network, the cellular communications network having an overlapping coverage area with a Wireless Local Access Network (WLAN) the method comprising:
   receiving data relating to the WLAN and the cellular communications network, wherein the received data relates to congestion in the WLAN;
   analyzing the received data to identify congestion in the WLAN; and
   configuring a downlink capacity of the cellular communications network based on the analysis of the received data, including changing a ratio of uplink capacity to downlink capacity of the cellular communications network in response to the identified congestion in the WLAN.

2. A method as claimed in claim 1, wherein the analyzing includes comparing a data point in the received data to a predetermined threshold.

3. A method as claimed in claim 1, further comprising:
   receiving new data relating to the WLAN and the cellular communications network;
   analyzing the new received data; and
   reconfiguring the downlink capacity of the cellular communications network based on the analysis of the new received data.

4. A method as claimed in claim 1, wherein the received data further relates to congestion in the cellular communications network.

5. A method as claimed in claim 4, wherein, if both the cellular communications network and the WLAN are congested, the ratio of uplink capacity to downlink capacity of the cellular communications network is configured based on a predetermined policy.

6. A method as claimed in claim 1, wherein the received data relates to devices in at least one of the cellular communications network or the WLAN.

7. A non-transitory computer-readable storage medium storing a computer program or suite of computer programs which, upon execution by a computer system, performs the method of claim 1.

8. A Customer Premises Equipment (CPE) comprising:
   a cellular transceiver configured for transmissions in a cellular communications network; and
   a processor adapted to receive data relating to a WLAN and the cellular communications network, wherein the received data relates to congestion in the WLAN, analyze the received data to identify congestion in the WLAN, and define a downlink capacity of the cellular communications network based on the analysis of the received data,
   wherein transmissions by the cellular transceiver are in accordance with the defined downlink capacity, and wherein the processor is adapted to configure the downlink capacity of the cellular communications network by changing a ratio of uplink capacity to downlink capacity of the cellular communications network in response to the identified congestion in the WLAN.

9. A CPE as claimed in claim 8, wherein the processor analyzes the received data by comparing a data point in the received data to a predetermined threshold.

10. A CPE as claimed in claim 8, wherein the processor is adapted to
    receive new data relating to the WLAN and the cellular communications network;
    analyze the new received data; and define a new downlink capacity of the cellular communications network based on the analysis of the new received data, wherein transmissions by the cellular transceiver are in accordance with the new defined downlink capacity.

11. A CPE as claimed in claim 8, wherein the received data further relates to congestion in the cellular communications network.

12. A CPE as claimed in claim 11, wherein, if both the cellular communications network and the WLAN are congested, the ratio of uplink capacity to downlink capacity of the cellular communications network is defined based on a predetermined policy.

13. A CPE as claimed in claim 8, wherein the received data relates to devices in at least one of the cellular communications network or the WLAN.

* * * * *